United States Patent
Emadi et al.

(10) Patent No.: US 7,193,385 B2
(45) Date of Patent: Mar. 20, 2007

(54) DIGITAL CONTROL OF MOTOR DRIVES

(75) Inventors: Ali Emadi, Chicago, IL (US);
Fernando Rodriguez, Hammond, IN (US); Piyush C. Desai, Des Plaines, IL (US)

(73) Assignee: Illinois Institute of Technology, Chicago, IL (US)

( * ) Notice: Subject to any disclaimer, the term of this patent is extended or adjusted under 35 U.S.C. 154(b) by 0 days.

(21) Appl. No.: 11/114,652

(22) Filed: Apr. 26, 2005

(65) Prior Publication Data
US 2006/0238158 A1 Oct. 26, 2006

(51) Int. Cl.
G05B 19/416 (2006.01)

(52) U.S. Cl. .................. 318/568.18; 318/432; 318/433; 318/434

(58) Field of Classification Search ................. 318/432, 318/433, 434
See application file for complete search history.

(56) References Cited

U.S. PATENT DOCUMENTS

| | | | |
|---|---|---|---|
| 3,831,073 A | 8/1974 | Tanikoshi | |
| 4,090,116 A | 5/1978 | Lippitt | |
| 4,129,810 A | 12/1978 | Harshberger, Jr. | |
| 4,201,936 A | 5/1980 | Roumanis | |
| 4,341,327 A | 7/1982 | Zeitz | |
| 4,386,305 A | 5/1983 | Kohzai et al. | |
| 4,422,113 A | 12/1983 | Mabon | |
| 4,514,667 A | 4/1985 | Sakmann et al. | |
| 4,544,869 A | 10/1985 | Pittaway | |
| 4,586,123 A | 4/1986 | Plassmeier | |
| 4,692,674 A | 9/1987 | Packard et al. | |
| 4,833,375 A | 5/1989 | Del Signore, II | |
| 4,845,608 A | 7/1989 | Gdula | |
| 4,951,549 A | 8/1990 | Olsen et al. | |
| 4,955,344 A | 9/1990 | Tatsumi et al. | |
| 5,019,757 A * | 5/1991 | Beifus | 318/254 |
| 5,060,151 A | 10/1991 | Mikyska et al. | |
| 5,223,774 A | 6/1993 | Ikeda et al. | |
| 5,373,205 A | 12/1994 | Busick et al. | |
| 5,404,085 A | 4/1995 | Resch et al. | |
| 5,486,747 A | 1/1996 | Welch | |
| 5,563,481 A | 10/1996 | Krause | |
| 5,717,297 A | 2/1998 | Karwath et al. | |
| 5,804,936 A | 9/1998 | Brodsky et al. | |
| 5,952,798 A | 9/1999 | Jones et al. | |
| 6,040,673 A * | 3/2000 | Isomura et al. | 318/615 |
| 6,153,993 A * | 11/2000 | Oomura et al. | 318/434 |
| 6,363,214 B1 * | 3/2002 | Merello et al. | 318/109 |
| 6,462,491 B1 | 10/2002 | Iijima et al. | |
| 6,611,117 B1 | 8/2003 | Hardt | |
| 6,670,786 B2 * | 12/2003 | Tobari et al. | 318/805 |
| 6,784,634 B2 | 8/2004 | Sweo | |

FOREIGN PATENT DOCUMENTS

| | | |
|---|---|---|
| JP | 61094116 A | 5/1986 |
| JP | 2000092881 A | 3/2000 |
| JP | 2003164193 A | 6/2003 |

* cited by examiner

*Primary Examiner*—Lincoln Donovan
*Assistant Examiner*—Erick Glass
(74) *Attorney, Agent, or Firm*—Pauley Petersen & Erickson

(57) ABSTRACT

A digital controller is easily implemented for variable speed or torque control of an electric motor or generator by using a comparator to determine a choice of control state outputs.

19 Claims, 3 Drawing Sheets

DIGITAL CONTROL OF MOTOR DRIVES

BACKGROUND OF THE INVENTION

1. Field of the Invention

The present invention relates generally to the control of electric machines. The present invention relates more specifically to the control of electric machines through the digital selection of operating states.

2. Discussion of the Related Art

Advanced electric motor drives are continually gaining popularity in motion control applications, with major users including consumer appliances, industrial machinery, aerospace applications, and automotive applications. Motor drives are used in a broad variety of applications from low-power home appliances such as washing machines, refrigerators, air conditioning, hand power tools, and cordless drives, robots, fitness machines, and medical instrumentation, to medium-power automotive applications such as electric power steering, active suspension, brake by wire, starter/alternator, and anti-lock braking systems, to high-power industrial motor drives and automation systems, electric and hybrid electric cars, propulsion systems for trains and locomotives, mass transit, movers, machine tools, elevators, pumps, and compressors. For all these applications, it can be desirable to have a low cost, but effective motor speed controller.

Hysteresis (band or bang bang) current control and PWM control are the most widely used speed control techniques for electric motors. Both of these control techniques are analog based but can be easily implemented on analog or digital components since they are well understood. Cost and implementation complexity are often the most important factors for design trade-offs between techniques, implementation, and strategy of motor control hardware. For digital implementation of the aforementioned techniques, microcontrollers, microprocessors, or digital signal processors (DSPs) may be used. However, it is important to note that digital implementation of such a control technique does not produce a true digital controller. Instead, what results is a digitally implemented non-digital control technique.

SUMMARY OF THE INVENTION

The present invention provides a digital controller for electric machines of all types including motors and generators. For ease of explanation the electric machine will be described herein as a motor being controlled by the digital controller. Embodiments of the present invention may comprise a controller for such a motor, e.g., advanced electric motor drives such as trapezoidal brush-less DC motor drives and switched reluctance motor drives, which can be low cost and very simple to implement in a cost effective integrated circuit (IC).

In one embodiment a binary state digital controller of the present invention deals with the motor drive as a binary state digital system, which desirably operates with a binary choice of predefined motor operation states to control speed or torque of the motor, digitally selected by simple IF/THEN logic based upon greater than/less than comparisons of a single operating motor value to a single control parameter. In other embodiments the digital controller of the present invention may provide a choice of more than two motor operation states based on control comparisons of greater complexity.

In certain embodiments, the operational state parameters for the motor may be based upon current control or conduction angle control. Speed or torque regulation can be achieved by monitoring the actual motor speed or other known, i.e., monitored, operating motor values and switching from one operational state to the other during operation, making the concept of the controller extremely simple for control circuit development. This simplicity can result in a low-cost IC for speed or torque control of motor drives.

The digital control scheme of the present invention is particularly useful for brush-less DC (BLDC) machines and switched reluctance machines (SRM). However, it is also applicable to all electric machines including DC brush machines, induction machines, and other permanent magnet machines and is applicable to both the motoring mode and the generation mode of electric machines.

Certain embodiments of the present invention digitally select between one of two available active motor states; i.e. operational states, and are thus referred to as binary state digital controllers. It will be appreciated that a plurality of state pairs may be used overall during implementation of the present invention.

In some embodiments, the active motor state can be digitally selected and then optimized in real time according to any of various known techniques to provide variable states as the motor is running. In more complex embodiments, for example, the controller may have three or more motor operation states from which to select and also may include an adaptive controller to optimize the operating state of the motor in real time.

The digital controller may define the control states based on different control parameters of the machine. These parameters may include conduction angle, turn-on angle, turn-off angle, maximum current, and/or hysteresis current band. The motor speed set point is compared to the actual motor speed. If the actual motor speed is lower than the speed set point, the controller selects the higher motor speed operating state. If the actual motor speed is higher than the speed set point, the controller selects the lower motor speed operating state. A motor position sensing device is not strictly necessary to determine motor speed. The present invention may work with a position sensor derived speed input or within the context a sensorless drive as long as motor speed information is obtained by the controller for comparison with the speed set point.

While the hardware implementation of some embodiments can result in hardware as efficient as an 8-pin application specific IC (ASIC) for variable speed or torque motor control, the present invention is not so limited. The implementation of the controller may be in any form including a digital signal processor (DSP), microprocessors, a microcontroller, any form of IC, or a combination of individual components.

BRIEF DESCRIPTION OF THE DRAWINGS

These and other objects and features of this invention will be better understood from the following detailed description taken in conjunction with the drawings wherein.

DESCRIPTION OF THE PREFERRED EMBODIMENTS

Discussion of the modules will be given herein with respect to specific functional tasks or task groupings that are in some cases arbitrarily assigned to the specific modules for explanatory purposes. It will be appreciated by the person having ordinary skill in the art that aspects of the present invention may be arranged in a variety of ways, or that functional tasks may be grouped according to other nomenclature or architecture than is used herein without doing violence to the spirit of the present invention.

Figure 1:
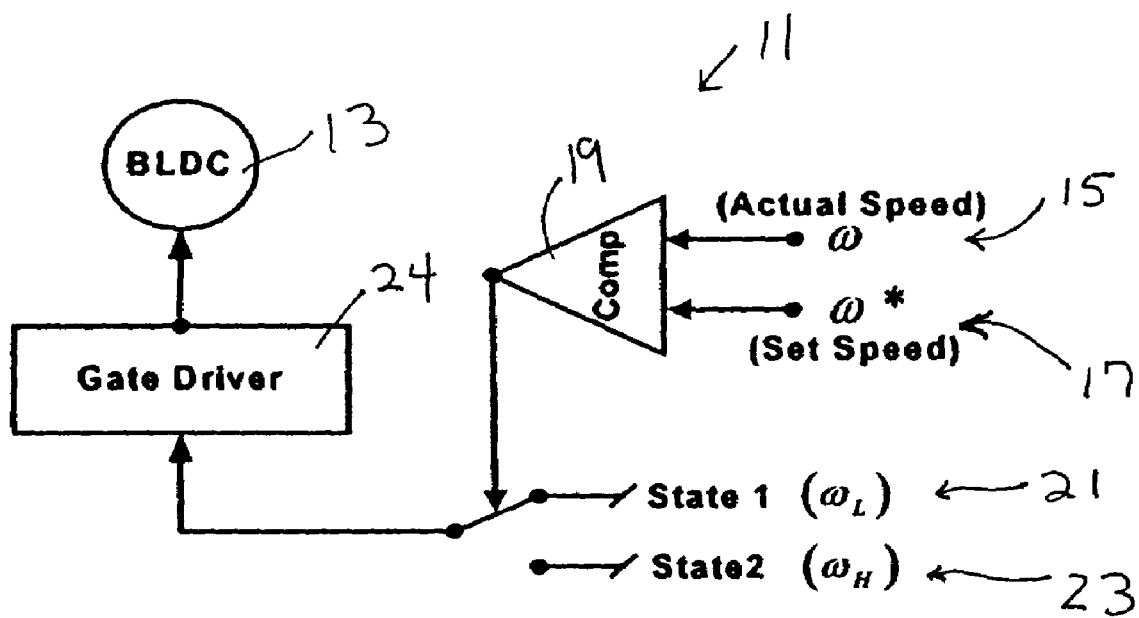
FIG. 1 is a block diagram of a general system utilizing a binary pair of operating states according to the present invention.

Referring to FIG. 1, an exemplary binary state digital controller 11 for speed control is provided for an electric machine such as a brushless DC motor (BLDC) 13 by obtaining and comparing an actual speed 15 of the motor 13 and a commanded, i.e., set point, speed 17 of the motor 13 with a comparator 19 for selecting a choice of two control state outputs, high speed 23, and low speed 21, as output to a gate driver functional block 24 operably connected for running the motor 13. It will be appreciated that the gate driver 24 functional block may include any necessary hysteresis control, current feedback, inverter, or other functions necessary or desired for final implementation of the controller. It will also be understood by the person of skill in the art that while the exemplary embodiments are explained for speed control, torque control can be readily obtainable by use of the present invention.

The binary state digital controller can be based on nothing more than a short list of "IF and THEN" statements. For example:

IF the actual motor speed $\omega$ is less than the commanded speed set point $\omega^*$, THEN switch to or stay at the HIGH speed ($\omega H$) motor operation state (state 2); and IF the actual motor speed $\omega$ is greater than the commanded speed set point motor speed $\omega^*$, THEN switch to or stay at the LOW speed ($\omega L$) motor operation state (state 1).

Figure 2:
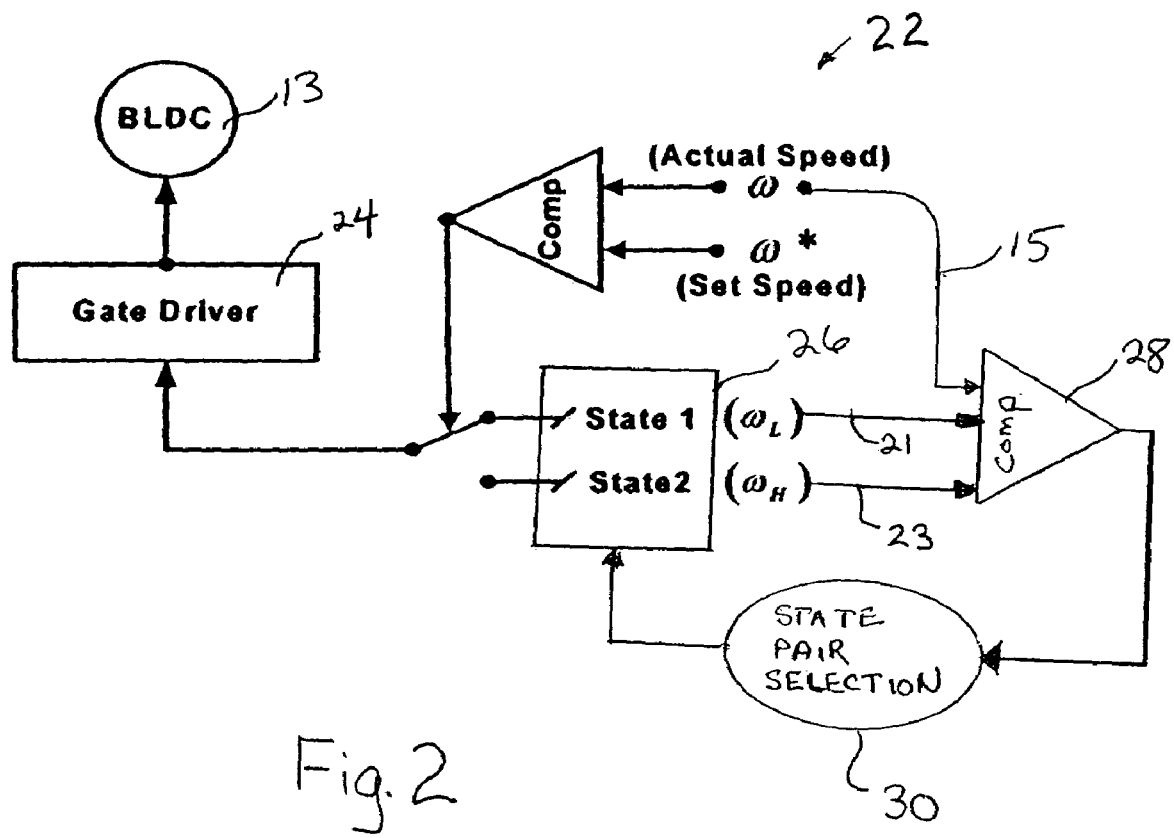
FIG. 2 is a block diagram of a system utilizing more than one binary pair of operating states according to the present invention.

As seen in FIG. 2, in a second embodiment 22, multiple sets of binary operation state pairs may be digitally selected by comparing the actual motor speed 15 with the low 21 and high 23 motor speeds of the current binary operation state pair 26 at a comparator 28 and selecting a new low/high operation state pair from a plurality of operation states 30 to provide a new pair bracketing the current actual speed 15 as the motor speed increases or decreases.

For multiple sets of binary operation pairs, an additional IF/THEN statement may include:

IF the actual motor speed is equal to HIGH or LOW, THEN select the next HIGH/LOW pair (new state 2/state 1) surrounding the actual motor speed.

In other embodiments the digital controller of the present invention may provide a choice of more than two motor operation states based on control comparisons of greater complexity. For example, the preceding three IF/THEN statements may be easily recombined, or added to, to allow the controller to select from several available motor operation states based on comparative inputs to the controller.

Figure 3:
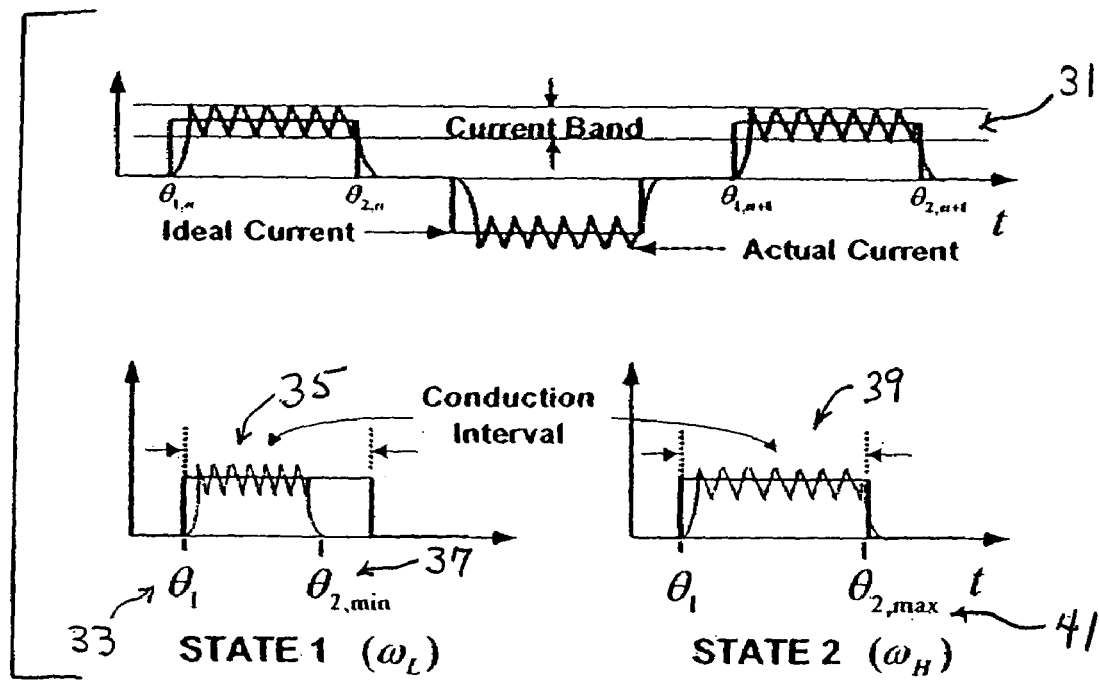
FIG. 3 illustrates high and low speed conduction angle control states.

Referencing FIG. 3, a current control parameter operation may define a current band 31, a first conduction angle $\theta_1$ 33, a low speed ($\omega L$) conduction interval 35 for state 1 with a minimum conduction angle $\theta_{2min}$ 37, and a high speed ($\omega H$) conduction interval 39 for state 2, with a maximum conduction angle $\theta_{2max}$ 41, to establish operating states for variable speed or torque motor operation. $\theta_1$ 33 and the current band 31 remain constant while the comparator 19 of the controller 11 (FIG. 1) selects between state 1 ($\omega L$) using $\theta_{2min}$, and state 2 ($\omega H$) using $\theta_{2max}$ to control the motor speed according to the rules set forth above.

Figure 4:
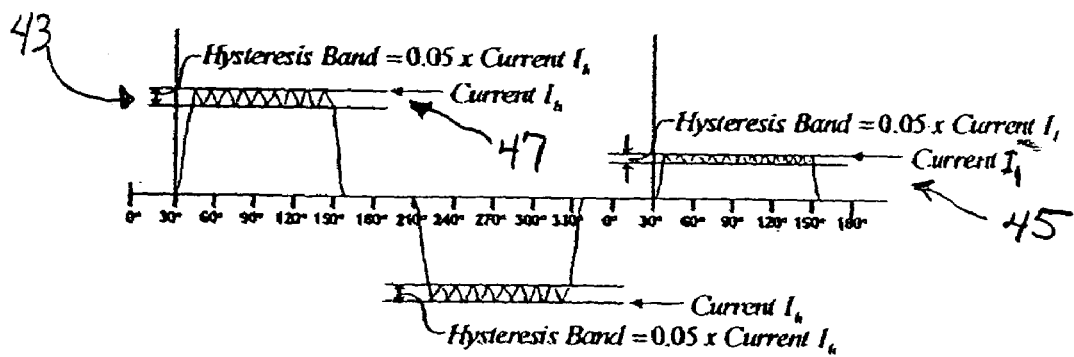
FIG. 4 illustrates high and low speed current control states.
Figure 1:
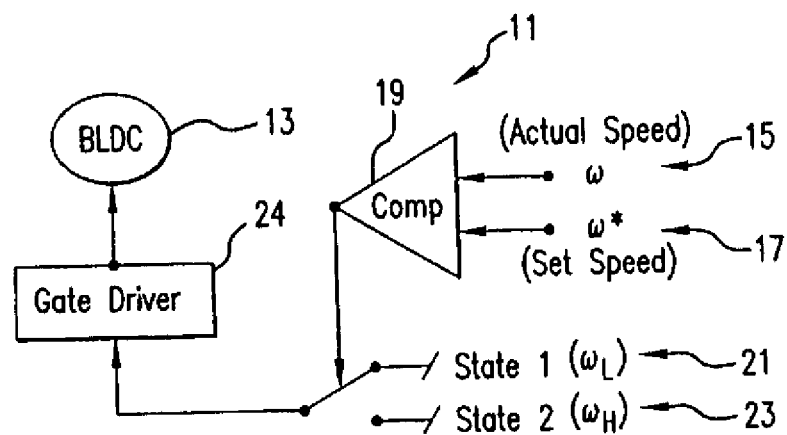
Figure 2:
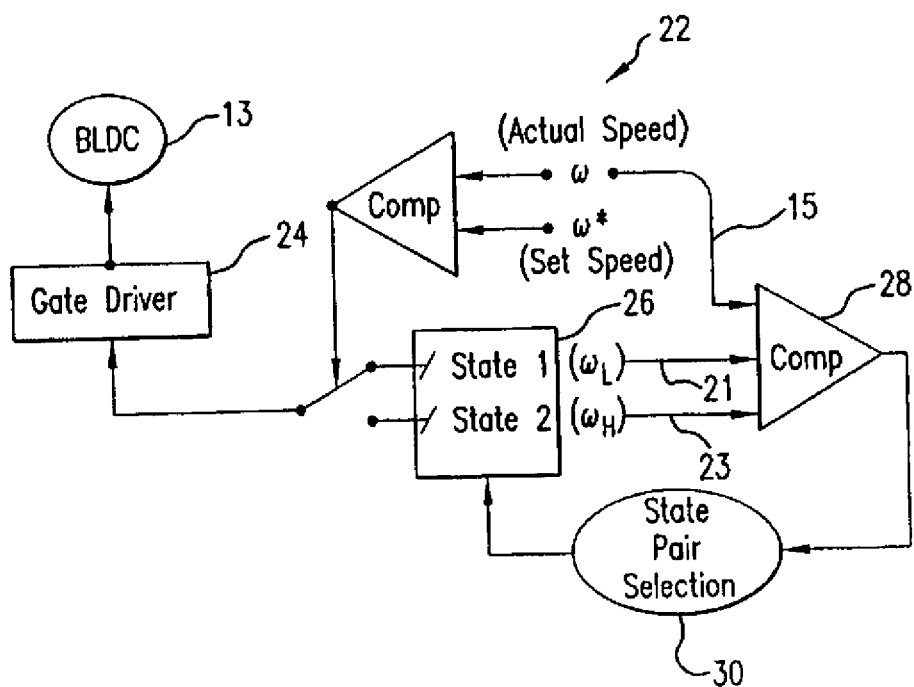
Figure 3:
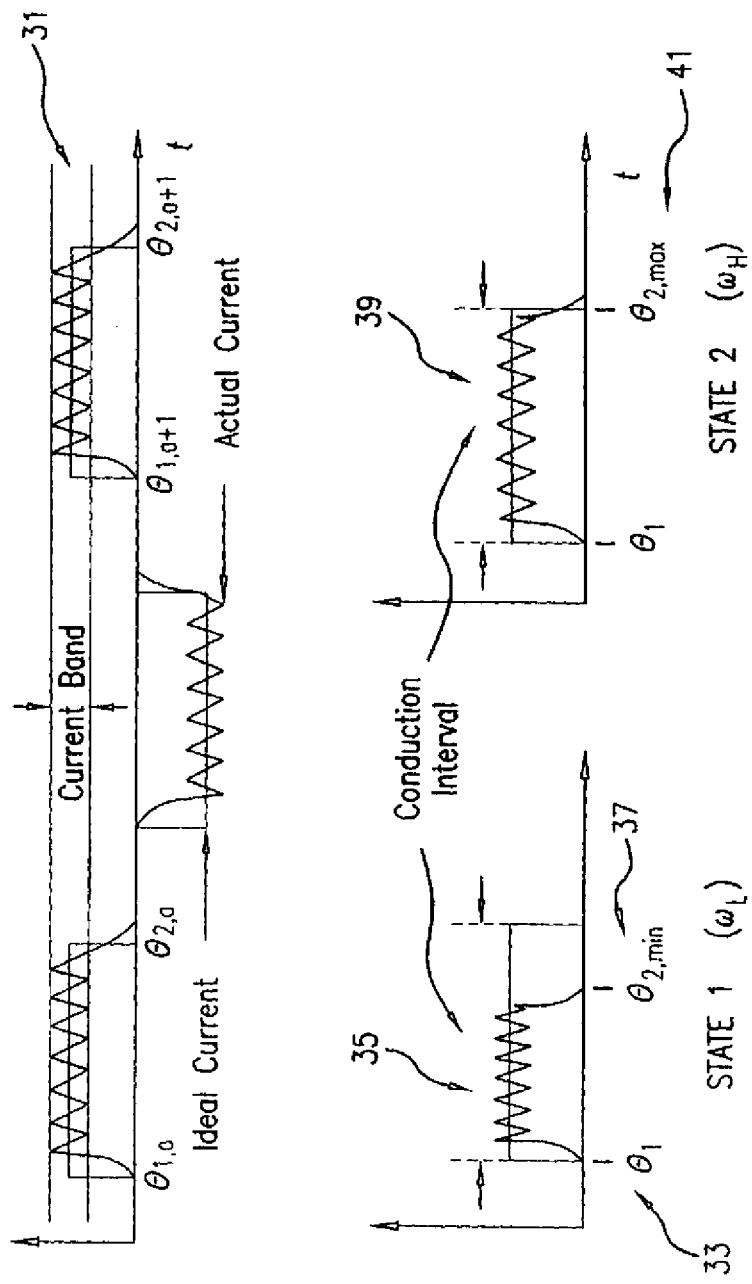
Figure 4:
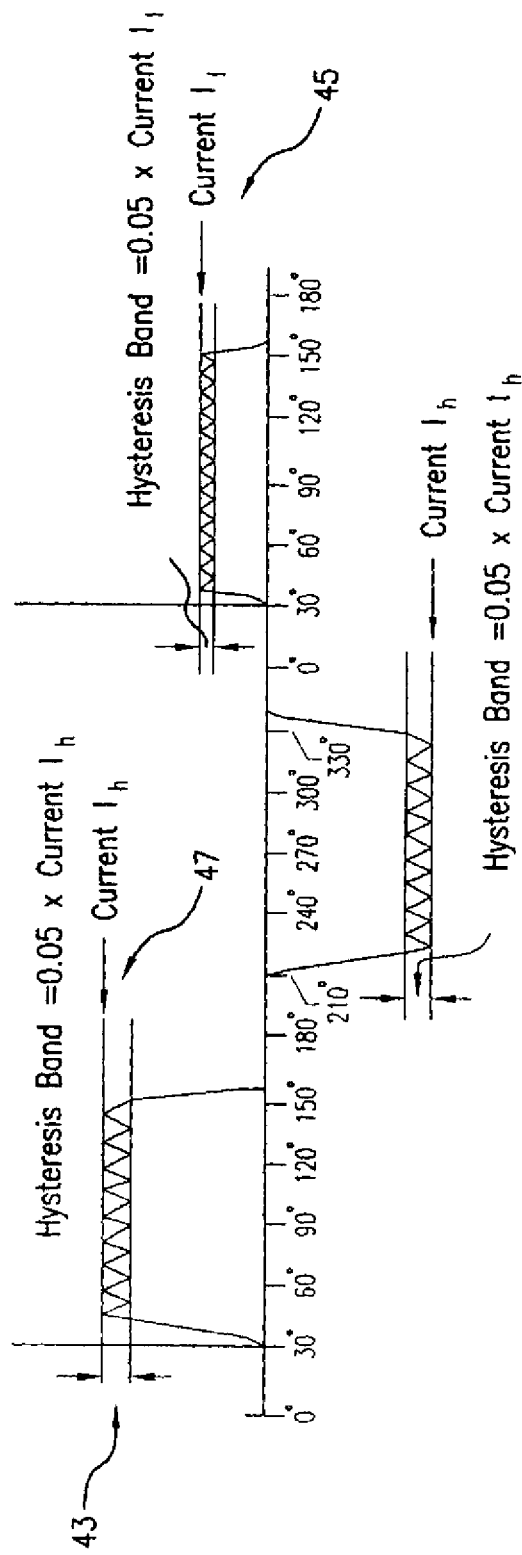

Referencing FIG. 4, the current is desirably regulated within a band 43 of five percent for motor operation. A low current level $I_l$ 45 is provided for state 1 ($\omega L$) and a high current level $I_h$ 47 is provided for state 2 ($\omega H$), as the operating states for variable speed or torque motor operation. The proper current band for any particular application may be left to the choice of the designer although it is believed to be better to have a small current band to reduce the speed ripple of the motor.

Details of the proper binary operating states, their parameters, and physical implementation of the circuitry for carrying out the present invention are considered to be within the skill and the discretion of the designer of ordinary skill in the art based upon the requirements of the motor to be driven in any particular application.

As the present binary state digital control technique can be very simple, speed and torque ripples may be a concern if a very wide range of speeds is considered. However, the speed and torque ripples can be reduced by selecting more than two predefined states for the digital controller or by optimizing the operating state of the motor using motor control methods applied adaptively to adjust the motor operation in real time. Selection of any adaptive technique for the real time operating state of the motor from among the known methods is considered to be within the skill and the discretion of the designer of ordinary skill in the art based upon the requirements of the motor to be driven in any particular application.

Major benefits of the present invention include simplicity and low cost implementation. It will be apparent that a few logic gates and comparators can accomplish the hardware implementation, which, in turn, can lead to an extremely low cost IC controller, such as an application specific integrated circuit (ASIC) capable of performing binary state digital control of the motor with a few external bias components. The present invention can thus reduce the cost and complexity of the motor control hardware. This, in turn, can boost the acceptance level of advanced motors for commercial mass production applications, and provide energy savings associated with the adjustable speed drives.

While certain exemplary embodiments have been put forth to illustrate the present invention, these embodiments are not to be taken as limiting the spirit or scope of the present invention which is defined by the appended claims.

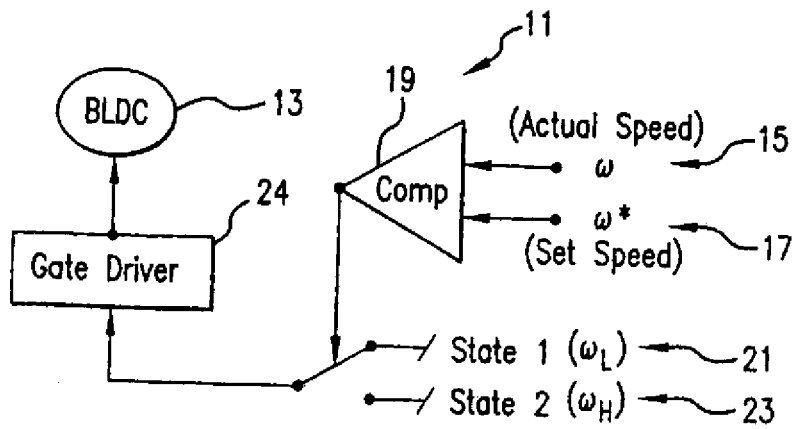

We claim:

1. A variable speed or torque controller for a variable speed or torque electric machine, comprising:
   an actual machine operating value input;
   a machine value set-point input;
   a comparator for determining if the actual machine operating value is less than or greater than the machine value set-point input;
   a binary pair of first and second active machine control states;
   the first machine control state having first predetermined parameters for running the machine at a first operating state value which drives operation of the electric machine in a first direction towards the machine value set-point, and the second machine control state having second predetermined parameters for running the machine at a second operating state value which drives operation of the electric machine in a second direction towards the machine value set-point; and
   instructions for selecting the first machine control state to implement the first predetermined parameters if the actual machine value is greater than the machine value set-point input, or selecting the second machine control state to implement the second predetermined parameters if the actual machine operating value is less than the machine value set-point input.

2. The variable speed or torque controller according to claim 1, further comprising:
a monitor for determining the actual machine operating value.

3. The variable speed or torque controller according to claim 1, further comprising:
a comparator for determining if the actual machine operating value is equal to the machine value set-point input.

4. The variable speed or torque controller according to claim 1, further comprising:
a comparator for determining if the actual machine operating value is less than, equal to, or greater than the first operating state value or the second operating state value.

5. The variable speed or torque controller according to claim 1, wherein the first and second operating state values are motor torques.

6. The variable speed or torque controller according to claim 1, wherein the first and second operating state values are motor speeds.

7. The variable speed or torque controller according to claim 6, further comprising:
means for selecting a binary pair of machine control states having first and second machine speeds selected to be respectively below and above the speed set-point.

8. The variable speed or torque controller according to claim 6 wherein the instructions comprise:
IF actual machine speed is less than the commanded speed set-point THEN switch to or stay at the second machine control state; and
IF actual machine speed is greater than the commanded speed set-point THEN switch to or stay at the first machine control state.

9. The variable speed or torque controller according to claim 6 wherein the instructions comprise:
IF actual machine speed is equal to the first speed or the second speed THEN select a new first and second machine control state pair.

10. The variable speed or torque controller according to claim 1 wherein the first and second machine control state parameters are stored within the controller.

11. The variable speed or torque controller according to claim 1 wherein the parameters include one of a current supply parameter or a conduction angle parameter for at least one phase of a machine.

12. The variable speed or torque controller according to claim 1 further comprising:
a hysteresis current control circuit.

13. The variable speed or torque controller according to claim 1 further comprising:
gate drivers for a machine.

14. The variable speed or torque controller according to claim 1 further comprising:
an electric machine operably connected to the controller.

15. The variable speed or torque controller according to claim 14 wherein the controller is a binary state variable speed or torque controller.

16. The variable speed or torque controller according to claim 1 wherein the first and second operating state value parameters are first and second conduction intervals, respectively.

17. The variable speed or torque controller according to claim 1 wherein the first and second operating state value parameters are first and second current levels, respectively.

18. The variable speed or torque controller according to claim 1 wherein the first and second operating state value parameters are first and second current bands, respectively.

19. A variable speed or torque controller for a variable speed or torque electric machine, comprising:
an actual machine operating value input;
a machine value set-point input;
a comparator for determining if the actual machine operating value is less than or greater than the machine value set-point input;
a first active machine control state, the first machine control state having predetermined parameters for running the machine at a first operating state value comprising a predetermined low speed or torque value;
a second active machine control state, the second machine control state having predetermined parameters for running the machine at a second operating state value comprising a predetermined high speed or torque value; and
instructions to implement the first machine control state if the actual machine value is greater than the machine value set-point input, or to implement the second machine control state if the actual machine operating value is less than the machine value set-point input.

* * * * *

UNITED STATES PATENT AND TRADEMARK OFFICE
CERTIFICATE OF CORRECTION

PATENT NO.          : 7,193,385 B2
APPLICATION NO.  : 11/114652
DATED                  : March 20, 2007
INVENTOR(S)         : Ali Emandi et al.

It is certified that error appears in the above-identified patent and that said Letters Patent is hereby corrected as shown below:

The title page showing the illustrated figure 2 should be deleted to appear as per attached title page.

The sheets of drawings consisting of figures 1-3 should be deleted to appear as per attached Figures 1-3.

Signed and Sealed this

Seventh Day of July, 2009

JOHN DOLL
*Acting Director of the United States Patent and Trademark Office*

(12) United States Patent
Emadi et al.

(10) Patent No.: US 7,193,385 B2
(45) Date of Patent: Mar. 20, 2007

(54) DIGITAL CONTROL OF MOTOR DRIVES

(75) Inventors: Ali Emadi, Chicago, IL (US); Fernando Rodriguez, Hammond, IN (US); Piyush C. Desai, Des Plaines, IL (US)

(73) Assignee: Illinois Institute of Technology, Chicago, IL (US)

( * ) Notice: Subject to any disclaimer, the term of this patent is extended or adjusted under 35 U.S.C. 154(b) by 0 days.

(21) Appl. No.: 11/114,652

(22) Filed: Apr. 26, 2005

(65) Prior Publication Data
US 2006/0238158 A1 Oct. 26, 2006

(51) Int. Cl.
*G05B 19/416* (2006.01)
(52) U.S. Cl. ............... 318/568.18; 318/432; 318/433; 318/434
(58) Field of Classification Search ............ 318/432, 318/433, 434
See application file for complete search history.

(56) References Cited

U.S. PATENT DOCUMENTS

| | | | |
|---|---|---|---|
| 3,831,073 A | 8/1974 | Tanikoshi | |
| 4,090,116 A | 5/1978 | Lippitt | |
| 4,129,810 A | 12/1978 | Harshberger, Jr. | |
| 4,201,936 A | 5/1980 | Roumanis | |
| 4,341,327 A | 7/1982 | Zeitz | |
| 4,386,305 A | 5/1983 | Kohzai et al. | |
| 4,422,113 A | 12/1983 | Mabon | |
| 4,514,667 A | 4/1985 | Sakmann et al. | |
| 4,544,869 A | 10/1985 | Pittaway | |
| 4,586,123 A | 4/1986 | Plassmeier | |
| 4,692,674 A | 9/1987 | Packard et al. | |
| 4,833,375 A | 5/1989 | Del Signore, II | |
| 4,845,608 A | 7/1989 | Gdula | |
| 4,951,549 A | 8/1990 | Olsen et al. | |
| 4,955,344 A | 9/1990 | Tatsumi et al. | |
| 5,019,757 A * | 5/1991 | Beifus | 318/254 |
| 5,060,151 A | 10/1991 | Mikyska et al. | |
| 5,223,774 A | 6/1993 | Ikeda et al. | |
| 5,373,205 A | 12/1994 | Busick et al. | |
| 5,404,085 A | 4/1995 | Resch et al. | |
| 5,486,747 A | 1/1996 | Welch | |
| 5,563,481 A | 10/1996 | Krause | |
| 5,717,297 A | 2/1998 | Karwath et al. | |
| 5,804,936 A | 9/1998 | Brodsky et al. | |
| 5,952,798 A | 9/1999 | Jones et al. | |
| 6,040,673 A * | 3/2000 | Isomura et al. | 318/615 |
| 6,153,993 A * | 11/2000 | Oomura et al. | 318/434 |
| 6,363,214 B1 * | 3/2002 | Merello et al. | 318/109 |
| 6,462,491 B1 | 10/2002 | Iijima et al. | |
| 6,611,117 B1 | 8/2003 | Hardt | |
| 6,670,786 B2 * | 12/2003 | Tobari et al. | 318/805 |
| 6,784,634 B2 | 8/2004 | Sweo | |

FOREIGN PATENT DOCUMENTS

| | | |
|---|---|---|
| JP | 61094116 A | 5/1986 |
| JP | 2000092881 A | 3/2000 |
| JP | 2003164193 A | 6/2003 |

* cited by examiner

*Primary Examiner*—Lincoln Donovan
*Assistant Examiner*—Erick Glass
(74) *Attorney, Agent, or Firm*—Pauley Petersen & Erickson

(57) ABSTRACT

A digital controller is easily implemented for variable speed or torque control of an electric motor or generator by using a comparator to determine a choice of control state outputs.

19 Claims, 3 Drawing Sheets